(12) United States Patent
Whitmore

(10) Patent No.: US 9,493,244 B2
(45) Date of Patent: Nov. 15, 2016

(54) STRUCTURAL ELEMENT OF AN AIR VEHICLE AIR INTAKE COMPOSED OF AN ARRAY OF PASSAGES WITH A HEXAGONAL CROSS SECTION

(75) Inventor: Ian Whitmore, Preston (GB)

(73) Assignee: BAE SYSTEMS PLC, London (GB)

( * ) Notice: Subject to any disclaimer, the term of this patent is extended or adjusted under 35 U.S.C. 154(b) by 407 days.

(21) Appl. No.: 14/119,678

(22) PCT Filed: May 23, 2012

(86) PCT No.: PCT/GB2012/051160
§ 371 (c)(1),
(2), (4) Date: Nov. 22, 2013

(87) PCT Pub. No.: WO2012/160375
PCT Pub. Date: Nov. 29, 2012

(65) Prior Publication Data
US 2014/0083518 A1    Mar. 27, 2014

(30) Foreign Application Priority Data

May 24, 2011 (GB) .................................. 1108951.3

(51) Int. Cl.
*F02C 7/055* (2006.01)
*B64D 33/02* (2006.01)
*F02C 7/04* (2006.01)

(52) U.S. Cl.
CPC ................. *B64D 33/02* (2013.01); *F02C 7/04* (2013.01); *F02C 7/055* (2013.01); *B64D 2033/0226* (2013.01); *B64D 2033/0286* (2013.01); *F05D 2250/132* (2013.01); *Y10T 137/0536* (2015.04)

(58) Field of Classification Search
CPC .......... B64D 33/02; B64D 2033/0226; B64D 2033/022; B64D 2033/0286; B64D 2033/026; B64D 2033/0273; Y10T 137/0536; F02C 7/04; F02C 7/055; F02C 7/042; F02C 7/05

USPC ........................................ 137/15.1; 244/53 B
See application file for complete search history.

(56) References Cited

U.S. PATENT DOCUMENTS 3,417,767 A * 12/1968 Young ..................... F02C 7/042
137/15.2
3,430,640 A * 3/1969 Lennard .................. F02C 7/042
137/15.1

(Continued)

FOREIGN PATENT DOCUMENTS

GB              668638          3/1952
JP          1-297394 A         11/1989

(Continued)

OTHER PUBLICATIONS

International Search Report (PCT/ISA/210) mailed on Aug. 1, 2012, by the United Kingdom Patent Office as the International Searching Authority for International Application No. PCT/GB2012/051160.

(Continued)

*Primary Examiner* — William H Rodriguez
(74) *Attorney, Agent, or Firm* — Maine Cernota & Rardin

(57) ABSTRACT

An air vehicle powered by a gas turbine engine, particularly, but not exclusively, an air vehicle having a blended wing body includes a gas turbine engine disposed in the body of the vehicle including an inlet face. An inlet channel having a convoluted geometry is configured such that air flow incident on the inlet face during operation is disordered. A structural element associated with the inlet channel and locate upstream of the inlet face is provided. The element is configured to modulate air flow, at least partially, to improve flow ordering in the incident air.

13 Claims, 3 Drawing Sheets

(56) References Cited

U.S. PATENT DOCUMENTS

| | | | | |
|---|---|---|---|---|
| 4,192,336 A * | 3/1980 | Farquhar | ............... | F02C 7/045 137/15.1 |
| 4,307,743 A * | 12/1981 | Dunn | ............... | B64D 33/02 137/15.1 |
| 4,354,346 A * | 10/1982 | Wooding | ............... | B64D 33/02 55/306 |
| 4,372,505 A * | 2/1983 | Syberg | ............... | B64D 33/02 244/53 B |
| 4,502,875 A * | 3/1985 | Ballard | ............... | F02C 7/052 137/15.1 |
| 4,919,364 A * | 4/1990 | John | ............... | B64D 27/20 244/53 B |
| 5,078,341 A * | 1/1992 | Bichler | ............... | B64D 33/02 137/15.1 |
| 5,447,283 A * | 9/1995 | Tindell | ............... | B64C 21/04 244/207 |
| 5,522,566 A * | 6/1996 | Hardy | ............... | B64C 1/0009 244/130 |
| 5,586,735 A * | 12/1996 | Falempin | ............... | B64D 33/02 137/15.1 |
| 6,138,950 A | 10/2000 | Wainfan et al. | | |
| 6,655,632 B1 | 12/2003 | Gupta et al. | | |
| 2006/0107648 A1 * | 5/2006 | Bulman | ............... | B64C 30/00 60/225 |
| 2007/0193277 A1 * | 8/2007 | Sheoran | ............... | F02C 7/042 60/802 |
| 2008/0121756 A1 | 5/2008 | McComb | | |
| 2008/0223978 A1 * | 9/2008 | Kechely | ............... | F02C 7/042 244/10 |
| 2008/0283677 A1 * | 11/2008 | Pederson | ............... | B64C 30/00 244/73 R |
| 2009/0114774 A1 | 5/2009 | Dyer et al. | | |
| 2009/0288711 A1 * | 11/2009 | Alvi | ............... | B64D 33/02 137/1 |
| 2010/0025542 A1 | 2/2010 | Dyer et al. | | |
| 2010/0037777 A1 * | 2/2010 | Davis | ............... | B01D 53/30 96/228 |
| 2012/0204525 A1 * | 8/2012 | Jarrier | ............... | F02C 7/055 55/385.7 |

FOREIGN PATENT DOCUMENTS

| | | |
|---|---|---|
| JP | 5-319398 A | 12/1993 |
| JP | 2000-345858 A | 12/2000 |
| WO | WO 00/20272 A1 | 4/2000 |
| WO | WO 2010/061071 A2 | 6/2010 |

OTHER PUBLICATIONS

United Kingdom Search Report issued on Sep. 16, 2011.

* cited by examiner

STRUCTURAL ELEMENT OF AN AIR VEHICLE AIR INTAKE COMPOSED OF AN ARRAY OF PASSAGES WITH A HEXAGONAL CROSS SECTION

RELATED APPLICATIONS

This application is a national phase application filed under 35 USC §371 of PCT Application No. PCT/GB2012/051160 with an International filing date of May 23, 2012 which claims priority of GB Patent Application 1108951.3 filed May 24, 2011. Each of these applications is herein incorporated by reference in its entirety for all purposes.

FIELD OF THE INVENTION

This invention relates to air vehicles powered by a gas turbine engine and, in particular, but not exclusively, to air vehicles having a blended wing body.

BACKGROUND OF THE INVENTION

As design of some compact air vehicles develops, especially those with blended wing bodies, the engine of the vehicle may be located at the rear end of an inlet duct which is of deviated or serpentine form. The complex geometry of the inlet duct may be convoluted in more than one dimension to achieve a required spatial footprint in an optimised design. When carrying out tests to assess engine characteristics within such an installation, it has been found by the applicant that there was an unexpected drop in performance at particular operating conditions.

SUMMARY OF THE INVENTION

Accordingly, in one aspect of the invention there is provided an air vehicle having a body;
a gas turbine engine disposed in the body and including an inlet face;
an inlet channel having a convoluted geometry configured such that air flow incident on the inlet face in operation of the vehicle is disordered; and
a structural element associated with the inlet channel and located upstream of the inlet face, the element being configured to modulate the air flow, at least partially, to improve flow ordering in the incident air.

The inlet channel may be provided by an inlet duct extending between a forward portion of the body and the inlet face of the engine, alternatively, the inlet channel may be an open channel, provided by a convoluted surface of the vehicle.

Whilst various forms of flow modulation are envisaged, in one arrangement, the flow modulation is effective to modify the swirl in the air passing to the engine. Although in some embodiments it may be beneficial to impart a swirl to the flow, it is preferred that the modulation is effective to reduce or minimise the swirl. In particular, the structural element may be configured to mitigate swirl in excess of 5°, more preferably swirl in excess of 10°.

The convoluted portion of the channel may be notionally bounded by a channel inlet plane upstream of the convolution and a channel outlet plane downstream of the convolution. The distance between these planes may represent the length of the convoluted channel. The structural element may be located in a downstream portion of the channel in the vicinity of the outlet plane.

The structural element may be located within the last 30% of the length of the convoluted channel i.e. proximate the outlet plane. Alternatively, the structural element may be located between the channel outlet plane and the inlet face of the engine.

Additionally or alternatively, the flow modulation may be effective to at least reduce turbulence in the air passing to the engine.

The structural element may take a variety of forms but it preferably comprises an open-ended structure comprising an array of cells disposed transversely across the flow passage and each defined by one or more wall sections aligned axially with the engine. Although the cells may be of different size and different form, it is preferred for them to be generally of uniform hexagonal shape.

The invention provides an air vehicle having a body, a gas turbine engine disposed in said body and including an inlet face, an inlet duct following a deviated path from a forward portion of the body to the inlet face of the engine, wherein a structural element is provided in the flow passage to the engine in or adjacent said duct to modulate the flow at least partially to improve flow ordering in the flow passing to said engine in operation.

Whilst the invention has been described above it extends to any inventive combination of features set out in the description, claims or drawings of this application.

BRIEF DESCRIPTION OF THE DRAWINGS

The invention may be performed in various ways, and, by way of example only, an embodiment thereof will now be described, in detail, reference being made to the accompanying drawings in which.

DETAILED DESCRIPTION

Figure 1:
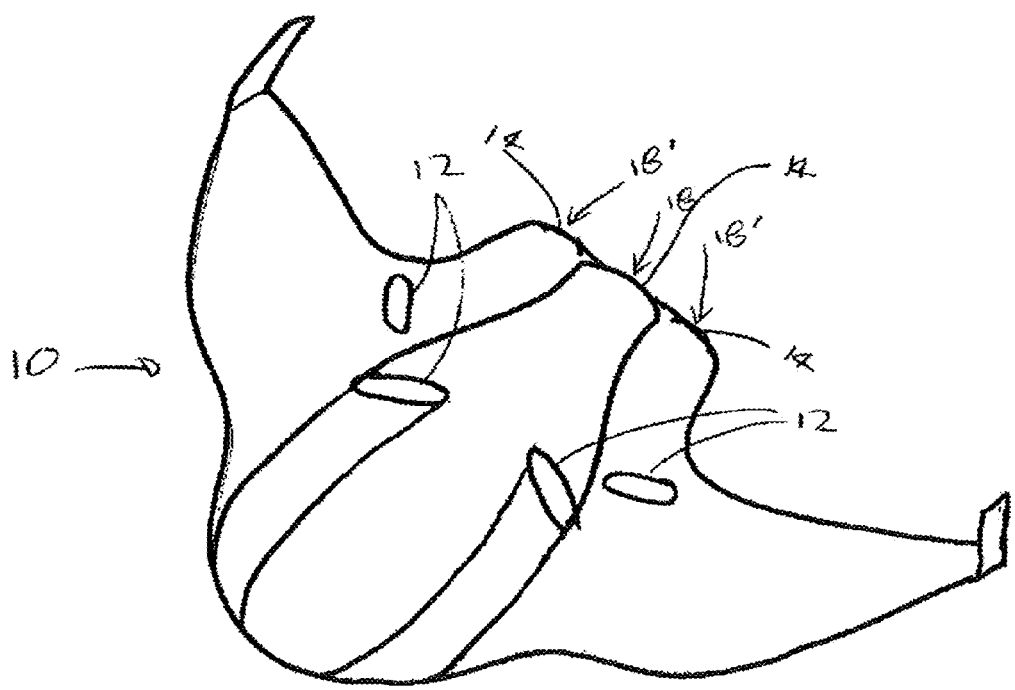
FIG. 1 is a schematic view of a blended wing body air vehicle in accordance with the invention.

Referring initially to FIG. 1 the civilian aircraft 10 has a blended wing configuration with a gas turbine engine 18 mounted centrally in the body. The engine may be embedded within the fuselage as shown to increase protection/survivability of the engine or, alternatively, the engine may be submerged to reduce acoustic levels. The engine 18 is supplied with air through one or more air inlet ducts 12 and exhausts propulsive efflux through respective outlets 14. Further engines 18' are provided laterally spaced from the central engine 18. The inlets 12 are not in line (in a direct linear sense) with their respective engines 18, 18', indeed, in this example it is shown that the central engine may be fed by two inlets 12.

Figure 2:
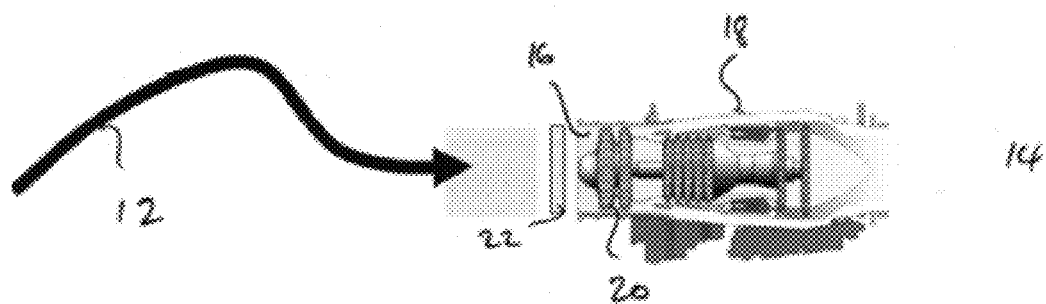
FIG. 2 is a schematic view of the inlet duct, flow modulator and gas turbine engine in the air vehicle of FIG. 1.

FIG. 2 illustrates part of the vehicle 10 in more detail. An inlet face 16 of each engine 18, 18' is connected to one or more air inlets 12. Each engine 18, 18' comprises a number of compressor blades 20. As seen in FIG. 2, the air inlet duct 12 is shaped so that it follows a deviated or serpentine form to enable air to be conveyed to the engine 18, 18'. Convolutions in duct 12 may be formed in more than one plane such that a particularly complex geometry is achieved. This convoluted, complex geometry can cause significant disturbance in the incident flow so that air does not enter the front face 16 of the engine 18 in an ordered manner.

Upon testing the performance of an engine with a convoluted inlet duct 12 of this form we have found that the engine surged during steady state (stabilised) operation and during engine handling (throttle slams and re-slams).

In a convoluted air flow approach to an engine e.g. through a convoluted duct, secondary flows, or swirl, are generated. Such swirl can reduce engine performance and, in extreme cases, as demonstrated in this testing programme, cause an engine to surge. Swirl can be described by the angle the flow makes with the local axial direction, and is usually described in two components defined in a local polar axis system. Circumferential swirl and radial swirl can be critical parameters for efficient engine operation.

Bulk or mean swirl for particular engine intake flows have been considered by manufacturers in relation to conventional aircraft engine inlets, but as the complexity of the geometry of engine intakes increase, the convolutions described thereby become more aggressive, the characteristics of local flows become more significant and must be addressed. Local features of swirl vary both circumferentially and radially around the engine face 16. Local swirls in, or exceeding, the range of 10° to 15° can present an engine intake compatibility problem, and even swirls in excess of 5° may do so, depending on the design tolerance of the engine.

Figure 3:
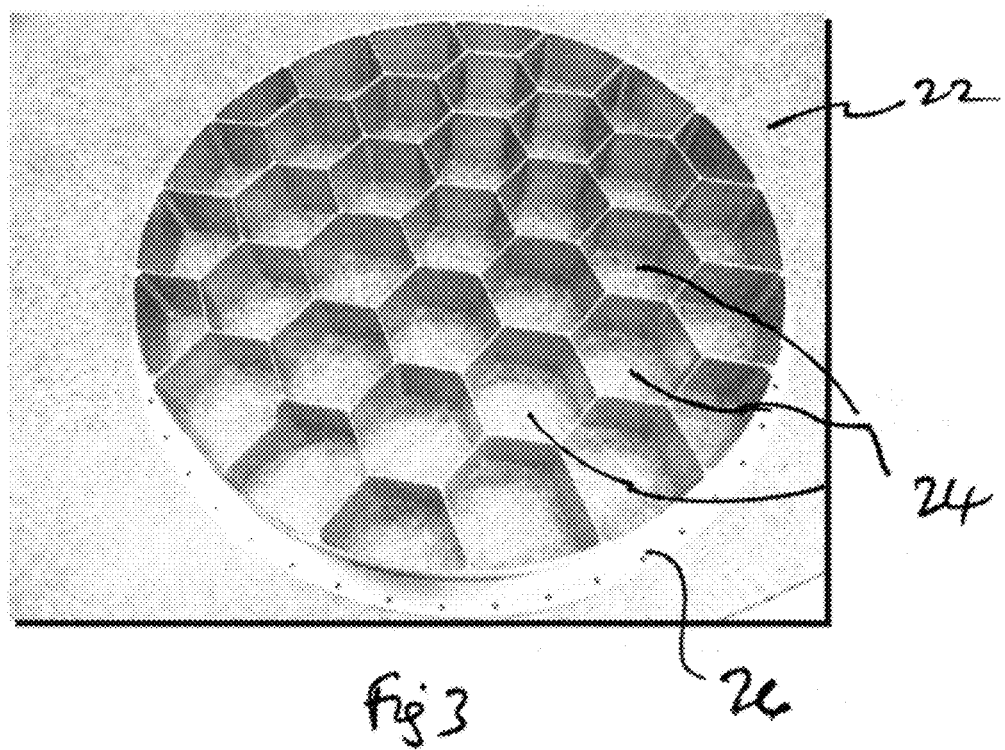
FIG. 3 is a perspective view of a 'honeycomb' flow modulator used in the arrangement of FIG. 1.

In this embodiment a flow modulator 22 of circular formation as shown in FIG. 3 is mounted upstream of the or each engine 18, 18' to impart improved flow ordering to the air S passing from the inlet duct to the engine. In this embodiment the flow modulator comprises an array of open-ended, close packed, hexagonal cells 24 disposed within an annular flange 26. It has been found in testing that, despite initial concerns that locating a flow modulator in the flow to the engine would reduce the amount of air supplied to the engine and thus reduce its efficiency (to the extent that the engine could cease to operate), and might present a Foreign Object Damage (FOD) risk to the engine, the provision of the flow modulator increases the efficiency of the engine and engine power output and reduces fuel consumption, need not increase FOD risk, and mitigates the issues with unexpected surges previously encountered. In this example, the hexagonal cells are approximately 100 mm in diameter and approximately 65 mm in streamwise length.

Figure 4:
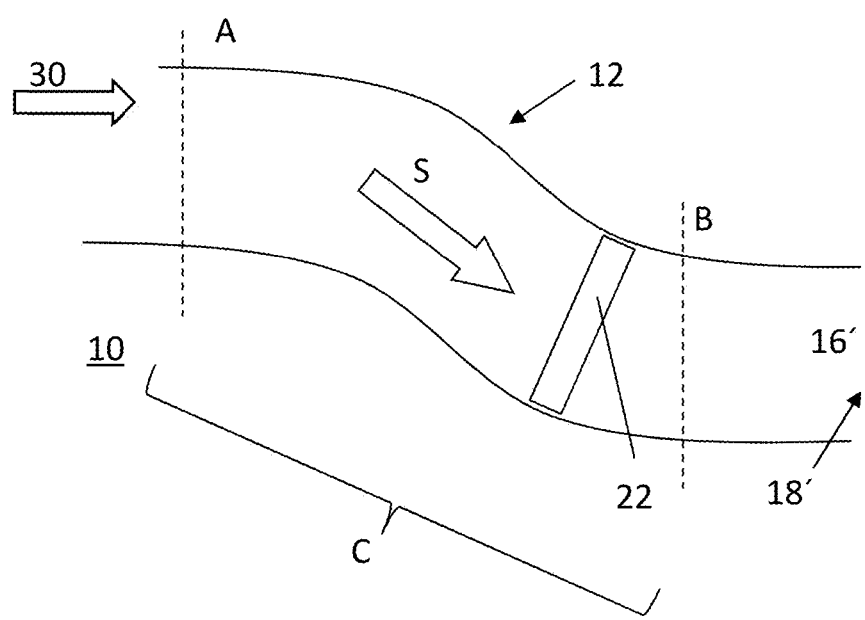
FIG. 4 is a schematic representation of a ducted inlet of an engine of an air vehicle.

The modulator 22 is designed to reduce levels of swirl downstream of a convoluted air-flow entry to the engine. In FIG. 4 a closed, convoluted inlet duct or channel 12 is shown. Free stream flow is depicted at 30 and remains substantially undisturbed at a channel inlet plane A. As depicted, downstream of the inlet plane A the geometry of duct 12 deviates in two dimensions to form a convoluted portion, more simply referred to as a "convolution" C, of the duct. In a more complex configuration, the geometry of the convolution C may vary in three dimensions. An outlet plane B of the channel (or duct) is defined after the convolution but upstream of engine 18, 18'. In some configurations the channel outlet plane B may be substantially co-located with inlet face 16 of engine 18, 18' whereas, in other configurations, inlet face 16 of the engine is spaced from channel outlet plane B.

The modulator 22 is, ideally, located downstream of any convolution C in duct 12 but upstream of the engine face 16, i.e. in the vicinity or downstream of channel outlet plane B. However, it may be located within the convolution C of the duct 12 and still provide a benefit of reducing the level of local swirl, generated within air flow S, subsequently experienced by the engine 18, 18'. If the modulator 22 is located upstream of the channel outlet plane B, it should be sited within the last 30% of the length of the convolution. The length of the convolution being represented by the portion of the duct 12 between the channel inlet plane A and the channel outlet plane B. More preferably, the modulator 22 is located within the final 20% (i.e. downstream portion) of the duct.

Figure 5:
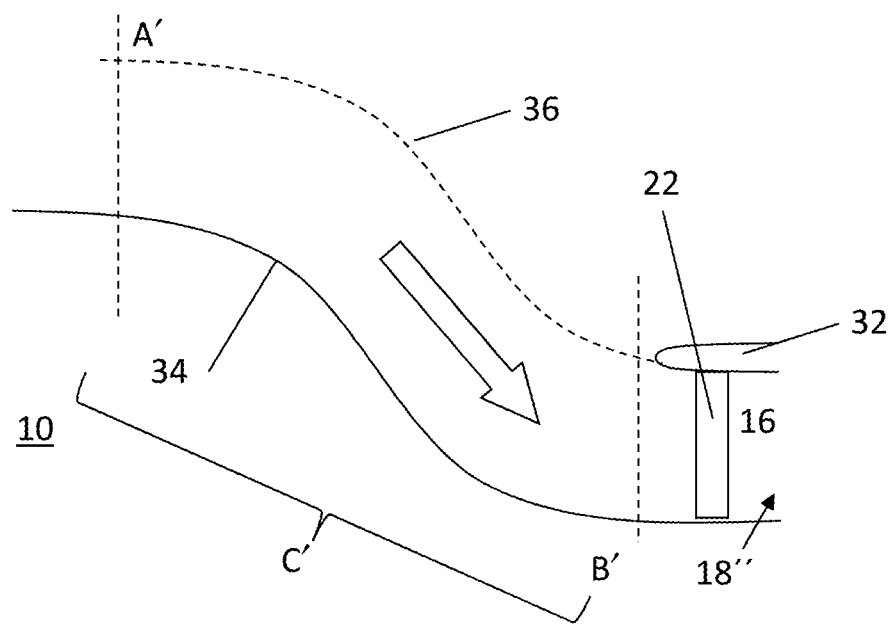
FIG. 5 is a schematic representation of an open channel inlet of an engine of an air vehicle.

If an engine 18", having a casing 32, is mounted adjacent a convoluted fairing 34 as illustrated in FIG. 5, similarly disordered flow will be experienced through an inlet face 16" of engine 18". A flow modulator 22 is correspondingly installed in the vicinity of the front face 16" of the engine 18" to constrain the incoming air and thus order the air flow prior to entry into the engine.

As illustrated, a notional capture stream tube 36 may be defined within the flow field adjacent the fairing 34. The capture stream tube 36 represents a virtual surface, substantially parallel to the surface of the fairing 34, which separates air S flowing into the inlet face from that air which does not pass through the engine. In this embodiment, the channel is an open channel defined by the surface of the fairing 34. A notional channel inlet plane A' and corresponding notional channel outlet face B' can be considered to define the extent of the convolution C'. Whilst the modulator 22 is ideally positioned within the boundary of the engine casing 32 as shown, a beneficial effect would also be achieved if the modulator was installed upstream of this location, within the downstream portion, say final 30% of the convoluted capture stream tube 36. The modulator 22 is either configured as a substantially free standing device to be mounted on and supported solely by the surface of the fairing 34 or the engine casing 32 may be extended upstream to more comprehensively support the modulator 22.

By providing a modulator 22 as described herein, local swirls in excess of 5° can be mitigated. Indeed, local swirls in excess of 10° or even 15° can be mitigated sufficiently that the engine 18, 18', 18" may function without experiencing a surge condition during steady state operation.

The invention claimed is:

1. An air vehicle comprising:
    a body;
    a gas turbine engine disposed in said body and including an inlet face;
    an inlet channel having a convoluted geometry configured such that air flow incident on the inlet face in operation will be disordered; and
    a structural element associated with the inlet channel and located entirely within a region that is downstream of a convoluted portion of the inlet channel and upstream of the inlet face, the element being configured to modulate the air flow, at least partially, to improve flow ordering in the incident air.

2. An air vehicle according to claim 1, wherein the inlet channel is provided by an inlet duct extending between a forward portion of the body and the inlet face of the engine.

3. An air vehicle according to claim 1, wherein the inlet channel is an open channel, provided by a convoluted surface of the vehicle.

4. An air vehicle according to claim 1, wherein said structural element is effective to modify swirl in the air passing to the engine.

5. An air vehicle according to claim 4, wherein said structural element is effective to at least reduce said swirl.

6. An air vehicle according to claim 1, wherein the structural element is effective to at least reduce turbulence in the air passing to the engine.

7. An air vehicle according to claim 1, wherein the structural element comprises:
   an array of open-ended cells disposed transversely across the inlet channel and each defined by one or more wall sections aligned axially with the engine.

8. An air vehicle according to claim 7, wherein the cells are hexagonal.

9. An air vehicle according to claim 4, wherein the structural element is configured to modify swirl in excess of 5°.

10. An air vehicle according to claim 9, wherein the structural element is configured to modify swirl in excess of 10°.

11. An air vehicle according claim 1, the channel comprising:
   an inlet plane upstream of a convoluted portion of the channel and an outlet plane downstream of the convoluted portion of the channel, a distance between said planes representing a length of the convoluted channel, wherein the structural element is located in a downstream portion of the channel in a vicinity of the outlet plane.

12. An air vehicle according to claim 11, wherein the structural element is located within 30% of the length of the channel proximate the outlet plane.

13. An air vehicle according to claim 11, wherein the structural element is located between the channel outlet plane and the inlet face of the engine.

* * * * *